United States Patent [19]

Katoh et al.

[11] Patent Number: 4,957,625

[45] Date of Patent: Sep. 18, 1990

[54] CERAMIC FILTER MODULES IN SERIES WITH PISTON BACKWASH

[75] Inventors: Yoshihisa Katoh, Toyota; Takashi Ogawa; Mitsumasa Hasegawa, both of Kariya; Masashi Fujimoto, Tokoake; Masaaki Hayashi, Anjyo, all of Japan

[73] Assignee: Toshiba Ceramics Co. Ltd., Tokyo, Japan

[21] Appl. No.: 344,498

[22] Filed: Apr. 27, 1989

Related U.S. Application Data

[63] Continuation of Ser. No. 87,290, Aug. 20, 1987, abandoned.

[30] Foreign Application Priority Data

Aug. 20, 1986 [JP] Japan ............................ 61-194595
Mar. 6, 1987 [JP] Japan ............................ 62-51365

[51] Int. Cl.$^5$ ............................................ B01D 29/66
[52] U.S. Cl. ................................... 210/119; 210/123; 210/323.2; 210/333.01; 210/335; 210/411; 210/450; 210/510.1
[58] Field of Search ............... 210/407, 411, 253, 123, 210/257.1, 323.2, 333.01, 333.1, 339, 340, 346, 450, 510.1, 119, 121, 252, 261, 262, 314, 323.2, 335, 344, 412, 437, 489

[56] References Cited

U.S. PATENT DOCUMENTS

| | | | |
|---|---|---|---|
| 2,855,100 | 10/1958 | Findlay | 210/412 |
| 3,215,273 | 11/1965 | Kryzer | 210/121 |
| 3,306,448 | 2/1967 | Baker | 210/121 |
| 3,344,923 | 10/1967 | Pau et al. | 210/323.2 |
| 3,503,516 | 3/1970 | Harms et al. | 210/323.2 |
| 4,088,576 | 5/1978 | Mott | 210/510.1 |
| 4,251,377 | 2/1981 | Schleinitz | 210/510.1 |
| 4,461,707 | 7/1984 | Thayer et al. | 210/323.2 |
| 4,678,564 | 7/1987 | Moorehead et al. | 210/411 |
| 4,735,781 | 4/1988 | Thijssen et al. | 210/407 |

Primary Examiner—Richard V. Fisher
Assistant Examiner—Wanda L. Millard
Attorney, Agent, or Firm—Wegner & Bretschneider

[57] ABSTRACT

An apparatus for filtering a liquid, includes supplying a starting liquid from a container to a passage of a pipe-like filter set in a filter casing, passing the starting liquid through the passage of the filter thereby to produce the filtrate, sending back the unfiltered liquid to the container, and back washing the filter by means of a hydraulic pressure device having a piston movable in a cylinder in such a manner that the filtrate is moved by the piston of the hydraulic device.

5 Claims, 6 Drawing Sheets

CERAMIC FILTER MODULES IN SERIES WITH PISTON BACKWASH

This application is a continuation of U.S. application Ser. No. 087,290, filed Aug. 30, 1987, now abandoned.

BACKGROUND OF THE INVENTION

This invention relates to a method and apparatus for filtering a liquid.

In order to back wash a tubular filter, the compressed air is applied to the filtrate remaining in a filter casing. The pressure of the compressed air is larger than that of the starting liquid to be filtered. Thus, impurities attached to a filter surface of the tubular filter can be detached from the filter and then suspended in the starting liquid.

In such a conventional method, the compressed air is further compressed due to the impact of the starting liquid. This causes some of the impurities to be again attached onto the filter surface so that the quantity of filtrate can not be increased to a desired degree.

On the other hand, the compressed air should not contain miscellaneous bacteria particularly when the starting liquid contains useful bacteria.

Japanese Utility Model Laying-Open No. 60-132817 discloses an apparatus for back washing a filter having slits which can be rotated so as to irradiate low-frequency sound wave on the slits for the back washing purpose. However, in this apparatus, the filtration must stop whenever a filter needs to be back washed. Thus, the operation rate of the apparatus is decreased.

SUMMARY OF THE INVENTION

The object of this invention is to provide an apparatus and method for filtering a liquid by a ceramic filter which can be back washed in such a manner that miscellaneous bacteria have no effect and the operation rate does not decrease so that the ceramic filter can be filtered at a high efficiency.

This invention provides a method and apparatus for filtering a liquid, and includes supplying a starting liquid from a container to a passage of a pipe-like filter set in a filter casing, passing the starting liquid through the passage of the filter thereby to produce the filtrate, sending back the unfiltered liquid to the container, and back washing the filter by means of a hydraulic pressure device having a piston movable in a cylinder in such a manner that the filtrate is moved by the piston of the hydraulic device.

A ceramic filter can be back washed during the filtration step. As the pressure is applied to the filtrate by means of a hydraulic pressure device, the impurities removed from the filter surface are not again attached thereto. Thus, the filtration rate can be maintained good so as to obtain a high filtration efficiency. As the piston directly applies the pressure onto the filtrate, miscellaneous bacteria are not mixed with the filtrate when the filter is back washed.

DESCRIPTION OF THE EMBODIMENTS

Figure 1:
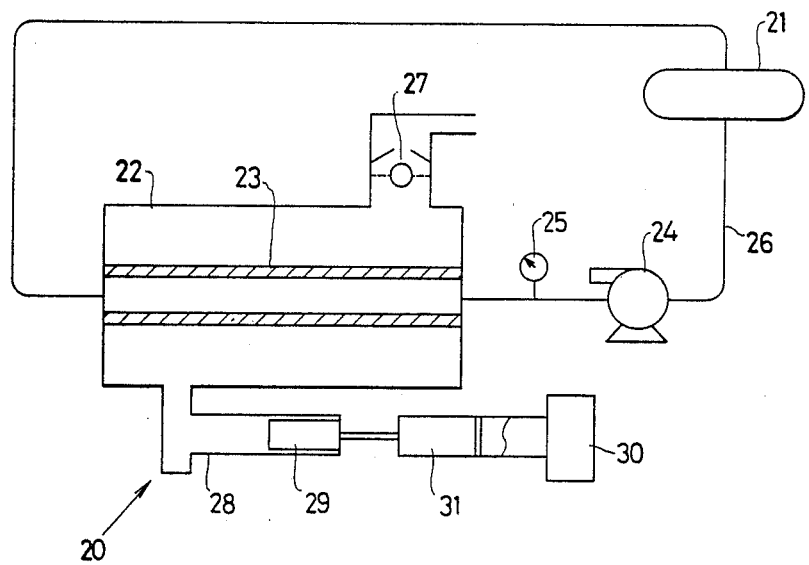
FIG. 1 is a schematic explanation view showing an apparatus for filtering a liquid according to this invention.

Referring to FIG. 1, a container 21 contains a starting liquid to be filtered. A pipe-like ceramic filter or filters 23 each having a passage are arranged in a filter casing 22 which is connected to the container 21 through a circulating line 26 in which a pump 24 and a flow meter 25 are placed. The starting liquid is filtered when it flows through the passage of the ceramic filter 23 in a cross flow manner. The filtrate is sent through a float valve 27 to a tank (not shown) positioned out of the filter casing 22. The unfiltered liquid is sent back to the container 21.

The filter casing 22 is equipped with a back washing device 20 including a hydraulic pressure device having a cylinder means 28 and a piston 29 movable therein and an actuator 30. The piston 29 is actuated by the actuator 30 through oil 31 within a casing connected with actuator 30. The actuator 30 may be formed of a desired type such as an air type or a hydraulic type.

A method of back washing the ceramic filter 23 will be explained.

In the filtering operation, the actuator 30 is actuated for a short time, e.g. of 1 to 2 sec so as to move the piston 29 through the oil 31 in such a way that a pressure of the filtrate out of the filter 23 within the filter casing 22 becomes larger than that of the liquid in the filter 23. At the same time, the filtrate is moved into the filter 23 at a flow rate higher than the filtration rate so that the float valve 27 can be closed. Thus, the impurities attached to a filter surface of the ceramic filter 23 are removed therefrom and then suspended into the liquid in the filter casing 22. As a result, one back washing is completed.

After that, the piston 29 moves back to its original position in such a manner that a volume alteration of the cylinder 28 per a unit time is always smaller than a filtration rate by the ceramic filter 23.

In such a method, the back washing can be carried out while the starting liquid is being filtered. The impurities which have been removed from the filter 23 are suspended into the liquid in the filter and not again attached onto the filter 23. Therefore, a high filtration efficiency can be maintained. In addition, as the filtrate is moved by the piston 29, there is no possibility that miscellaneous bacteria have an effect on the filtrate.

Figure 2:
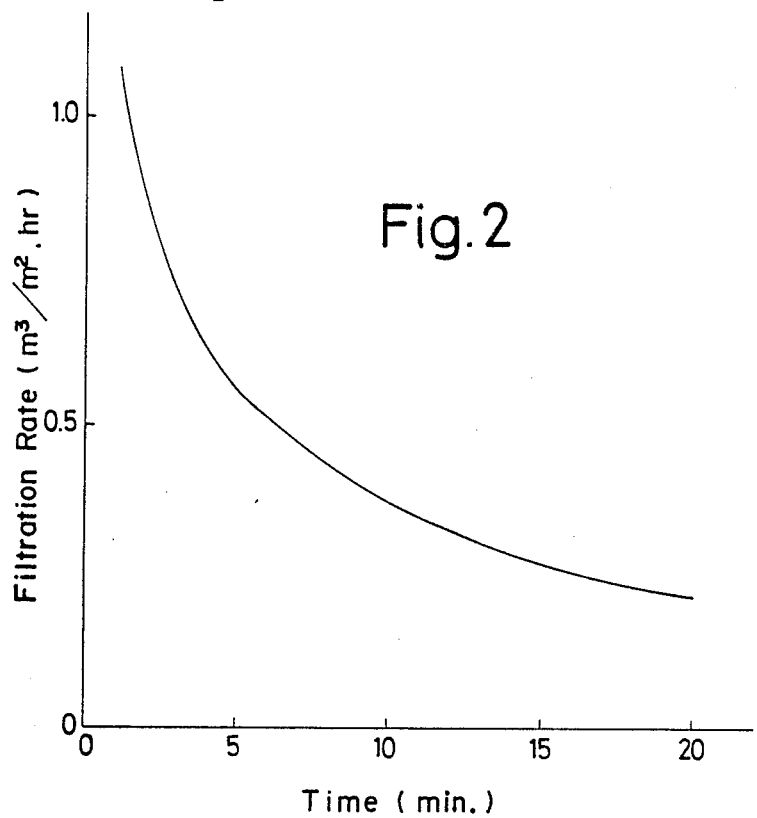
FIG. 2 is a graph showing a relationship between filtration time and filtration rate when aged mash for soy sauce, a dark brown liquid made from soybeans, is filtered by the apparatus of FIG. 1 without back washing.
Figure 7:
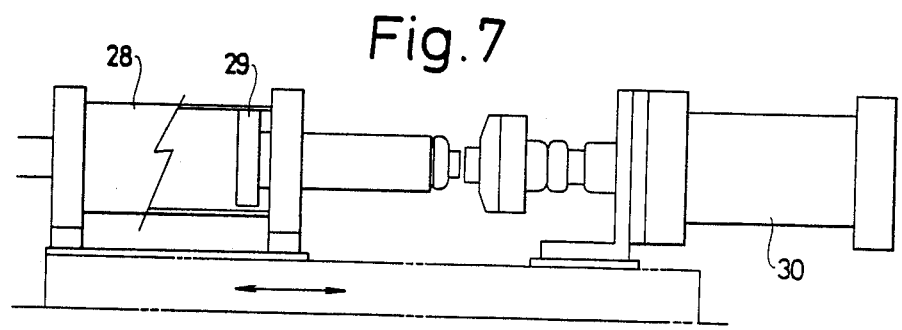
FIG. 7 is an enlarged side view showing a back washing device of the apparatus of FIG. 1.
Figure 3:
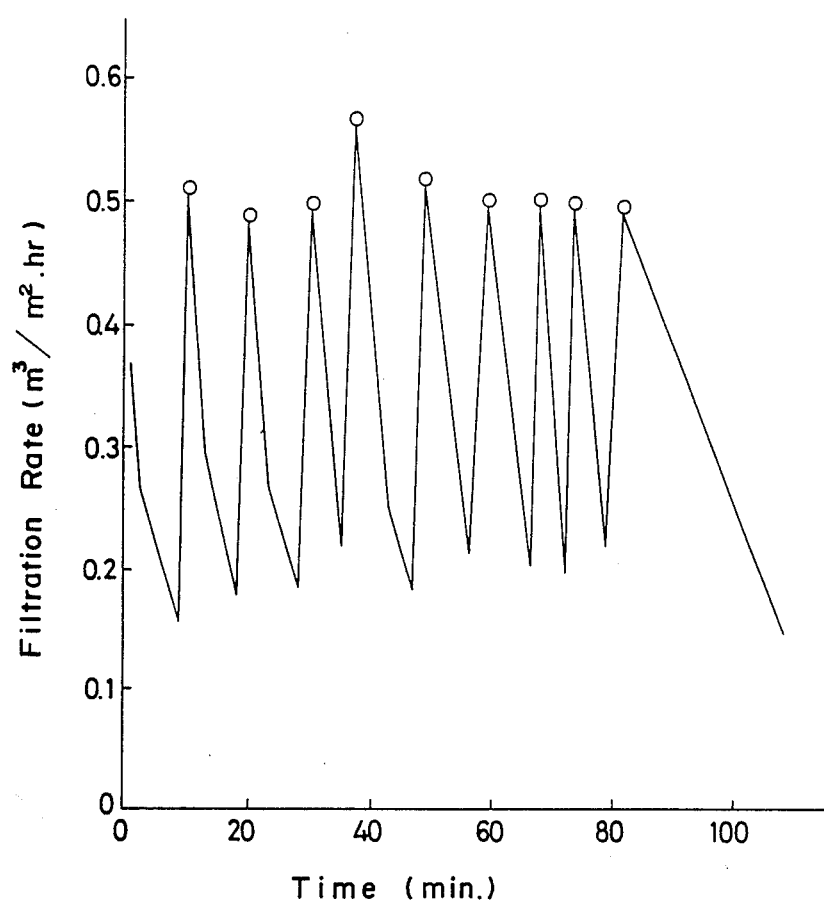
FIG. 3 is a graph showing a relationship between filtration time and filtration rate when aged mash for soy sauce is filtered by the apparatus of FIG. 1 in case the back washing is repeated.
Figure 4:
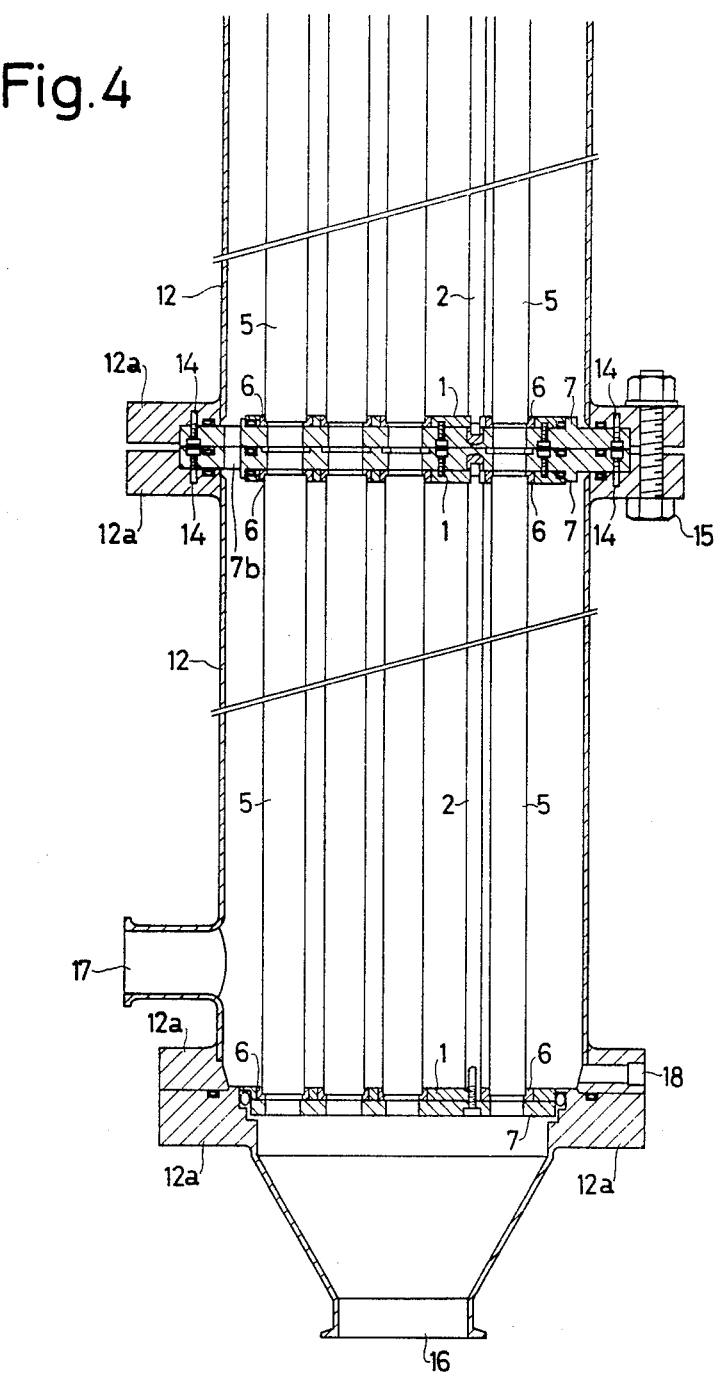
FIG. 4 is a schematic sectional view showing a preferred arrangement of plural ceramic filters in a filter casing for use in an apparatus of this invention.
Figure 5:
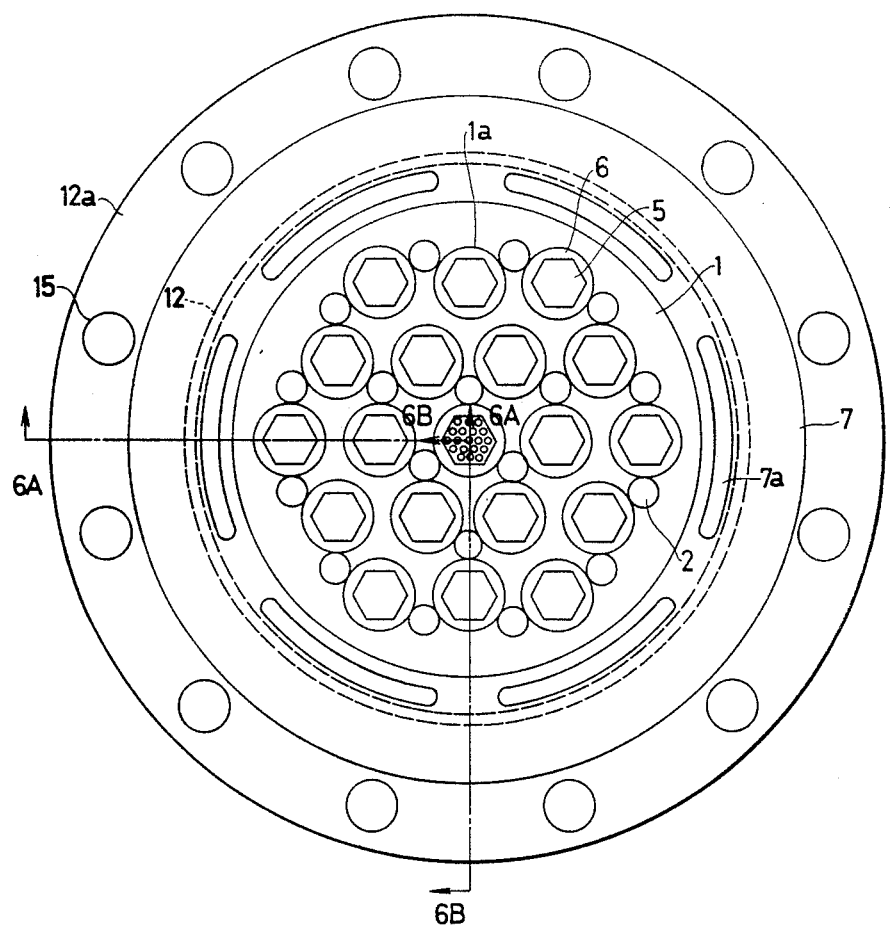
FIG. 5 is an end view showing the arrangement of the plural ceramic filters in the filter casing as shown in FIG. 4.
Figures 6A, 6B:
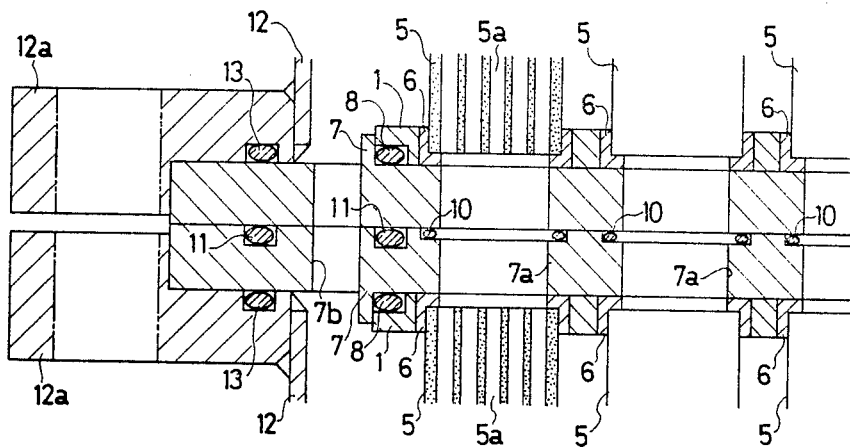
FIG. 6A is a sectional view taken along the line 6A—6A of FIG. 5.
FIG. 6B is a sectional view taken along the line 6B—6B FIG. 5.

FIGS. 2 and 3 show test results when aged mash for soy sauce is filtered by the apparatus of FIG. 1. The ceramic filter 23 has a filter layer having a pore diameter of about 0.8 micron meter. The filtration is carried out at a circulating speed of 3m/sec with a pressure difference of 0.5 kg. In back washing the filter 23, a pressure of 3 kg/cm$^2$ is applied to the filtrate by means of the piston 29, and the filtrate is moved into the filter 22 at a speed of $8.2 \times 10^{-5}$ m$^3$/m$^2$.sec. FIG. 2 shows a filtration curve when no back washing is carried out. FIG. 3 shows a filtration curve when the back washing is repeated at each point of small circles.

FIGS. 4, 5, 6A, and 6B show a vertical type filtering apparatus which is substantially same as that of FIG. 1 except a filter casing 12 and its related construction. In the shown embodiment, nineteen ceramic filters 5 are arranged vertically in parallel within the filter casing 12 so as to constitute one module. Each filter 5 has nineteen liquid passages each having an inner diameter of 4 mm, a length of 850 mm and a hexagonal outer surface, and is made of alumina. Although one filter 5 is shown in detail in FIG. 5, all filters 5 have the same construction. Two modules are joined in series to each other so that the total number of the filters 5 is 38. The filter casing 12 is made of stainless steel and has a total length of 2,000 mm and a diameter of 500mm.

One module will be explained. Plural supports 2 are fixed between two end plates 1 made of stainless steel through O-rings 3 by means of hexagonal nuts 4. The end plates 1 each has nineteen through-holes 1a having a diameter larger than an outer diameter of the ceramic filters 5. Each filter 5 having 19 liquid passages passes through each through-hole 1a of the end plates 1. Packings 6 are disposed between the through-holes 1a and the ceramic filters 5 for the sealing purpose. Packing pressure plates 7 are fixed between the upper and lower end plates 1 through O-rings 8 by means of bolts 9. The packing pressure plates 7 have first holes 7a for passing the starting or unfiltered liquid near the ends of the ceramic filters 5 and second holes 7b for passing the filtrate. A periphery of the packing pressure plate 7 is fixed to a flange portion 12a of the filter casing 12 through O-rings 13 by means of bolts 14.

Two modules, each of which is assembled in the above-stated manner, are joined in series to each other in such a way that O-rings 10 and O-rings 11 are pressed between the packing presser plates 7. The filter casing 12 is in an assembled condition in which two halves are joined at their flange portions 12a by means of bolts and nuts 15. An inlet port 16 for the starting liquid is formed in a lower end of the filter casing 12 while an exit port (not shown) is formed in an upper end of the filter casing 12. An exit port 17 for the filtrate and a drain 18 are formed in a side portion of the lower half of the filter casing 12.

In the above-stated structure, the end plates 1 are supported by the supports 2 so as to constitute a rigid frame. In addition, the through-holes 1a of the end plates 1 and the ceramic filters 5 are sealed by the packings 6. Therefore, it is easy to replace only one ceramic filter 5, for example, for the repair purpose. If the packings 6 and/or the O-rings are made of a rubber having heat resistance such as fluoro rubber, silicone resin, butyl rubber or natural rubber, the heat has no effect on the sealing characteristics.

Figure 8:
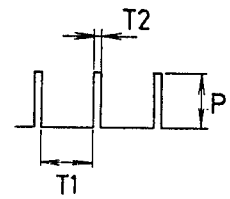
FIG. 8 shows two filtration curves.

FIG. 8 shows a filtration wave. $T_1$ denotes a filtration time. $T_2$ denotes a back washing time. P denotes a back washing pressure. A back washing time of about 0.2 sec or less is not enough to back wash the ceramic filter 23. A preferred back washing time is from 1 sec to 2 sec.

Figure 9:
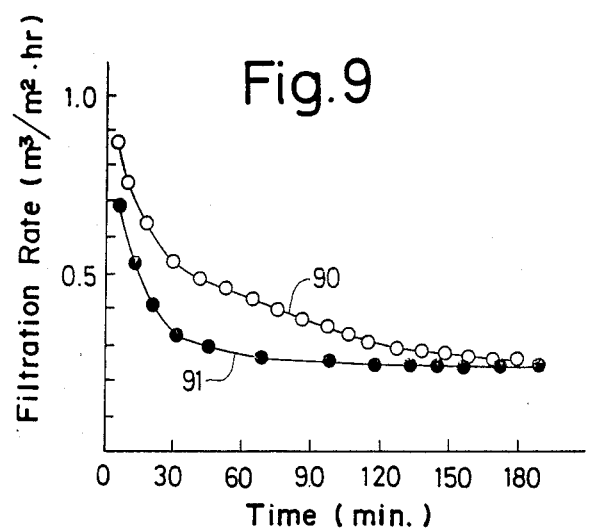
FIG. 9 shows a filtration wave.

FIG. 9 shows a relationship between back washing time and filtration rate. The curve 90 shows such a relationship when the back washing is repeated. Each back washing time is 1 sec. The curve 91 shows such a relationship in case of no back washing.

This application incorporates by reference the disclosures of U.S. application Ser. No. 087,352, filed Aug. 30, 1987, now abandoned, which discloses a filter having specific pore size characteristics, as well as U.S. application Ser. No. 087,351, filed Aug. 20, 1987, now U.S. Pat No. 4,839,488, issued June 13, 1989, and U.S. application Ser. No. 087,357, filed Aug. 20, 1987, now abandoned, which disclose specific uses for the ceramic filter in filtering a dielectric fluid used in electric discharge engraving and in filtering a reaction mixture in production of an ester, respectively.

We claim:

1. An apparatus for filtering a liquid, comprising:
   a container for storing a liquid;
   a filter casing containing two modules joined in series, each of the modules comprising a plural number of pipe-like ceramic filters arranged in parallel and having plural passages therein, plural end plates equal in number to the number of ceramic filters and having plural through-holes into which the ceramic filters are inserted, plural supports placed between the end plates for supporting the end plates in a fixed manner, and packings placed between the end plates and the ceramic filters in clearances defined between the end plates and the ceramic filters so that the packings cover portions of end surfaces of the ceramic filters and provide a seal between the through-holes of the end plates and the ceramic filters, the through-holes having inner diameters greater than corresponding outer diameters of the ceramic filters;
   means for connecting the container with the filter casing so that the liquid stored in the container can be supplied into the filter casing;
   plural packing pressure plates for fixing the casing to the end plates, the pressure plates having plural holes at positions corresponding to the through-holes to the end plates and applying a pushing force onto the packings so as to substantially completely seal the filters, the pressure plates having holes communicating with outer sides of the filters;
   a back washing device attached to the filter casing which includes a hydraulic pressure device having a piston movable in a cylinder so that the filter can be back washed with filtrate moved by the piston when the hydraulic pressure device is actuated, and
   the piston being designed to move back to its original position after the back washing.

2. The apparatus of claim 1, wherein the two modules are joined to each other in series through O-rings where holes for passing the filtrate are formed.

3. The apparatus of claim 2, wherein the packings and the O-rings are made of a rubber having a heat resistance.

4. The apparatus of claim 1, wherein a float valve is connected to the filter casing to prevent the filtrate from discharging when the filtrate is forced to be moved into the filter at a flow rate higher than the filtration rate.

5. The apparatus of claim 1, wherein the piston is designed to move back to its original position after the back washing in such a manner that the volume of the cylinder is altered at a rate which is smaller than the filtration rate of the ceramic filter.

* * * * *